United States Patent [19]

Morlet

[11] 3,934,864
[45] Jan. 27, 1976

[54] PROCESS AND INSTALLATION FOR REDUCTIVE MELTING OF IRON SCRAP, POWDER OR SPONGE

[75] Inventor: Jean Georges Marie Morlet, Paris, France

[73] Assignee: Creusot-Loire, Paris, France

[22] Filed: Dec. 14, 1971

[21] Appl. No.: 208,013

Related U.S. Application Data

[60] Division of Ser. No. 885,623, Dec. 16, 1969, abandoned, which is a continuation-in-part of Ser. No. 693,995, Dec. 27, 1967, abandoned.

[30] Foreign Application Priority Data

Jan. 13, 1967  France .............................. 67.90994

[52] U.S. Cl. ............................................ 266/36 H
[51] Int. Cl. ............................................ C21c 5/32
[58] Field of Search ..... 266/34 L, 34 LM, 35, 36 H, 266/36 P

[56] References Cited
UNITED STATES PATENTS

| | | | |
|---|---|---|---|
| 2,902,358 | 9/1959 | Kalling et al. ..................... | 266/36 H |
| 3,057,616 | 10/1962 | Wohlfahrt et al. ................ | 266/36 H |
| 3,150,963 | 9/1964 | Kurzinski ............................ | 75/60 |
| 3,216,714 | 11/1965 | Eibl et al. .......................... | 266/34 L |
| R26,364 | 3/1968 | Kurzinski ............................ | 75/43 |

FOREIGN PATENTS OR APPLICATIONS

| | | | |
|---|---|---|---|
| 1,003,514 | 9/1965 | United Kingdom .............. | 266/34 L |
| 1,009,327 | 11/1965 | United Kingdom .............. | 266/34 L |

*Primary Examiner*—Gerald A. Dost
*Attorney, Agent, or Firm*—Cameron, Kerkam, Sutton, Stowell & Stowell

[57] ABSTRACT

A ferrous substance such as iron scrap, powder or sponge, carbon, and a substance forming slag are heated in a rotary converter having an inclined axis and an upwardly facing opening. The charge thus formed in the converter is heated by a burner pointing towards the interior converter base. A complementary injection of industrially pure oxygen is provided in the zone of the flame, the total quantity of oxygen injected being such that the ratio $$\frac{CO_2}{CO + CO_2}$$

in the fumes is at least equal to 0.8.

5 Claims, 5 Drawing Figures

PROCESS AND INSTALLATION FOR REDUCTIVE MELTING OF IRON SCRAP, POWDER OR SPONGE

CROSS-REFERENCE TO RELATED APPLICATION

This is a division of application Ser. No. 885,623, filed Dec. 16, 1969, and now abandoned, which application is a continuation-in-part of my application Ser. No. 693,995, filed Dec. 27, 1967, with the same title, which application is abandoned.

BACKGROUND OF THE INVENTION

The invention relates to a process and installation for reductive melting of iron scrap, powder or sponge.

Numerous attempts have been made to melt scrap in a shaft furnace heated by an intensive fuel/oxygen burner. These attempts have revealed the difficulties involved in this process. For example, the charge of scrap may fall in during melting and damage the burner. Also, when this process is used, the burner is often smothered by the fumes released from the charge.

Reductive melting of iron sponge or powder involves similar difficulties, especially as regards smothering of the burner.

SUMMARY OF THE INVENTION

The invention consists of a process for reductive melting, characterised in that the ferrous substance, a material containing carbon, and possibly a substance forming slag are heated in a rotary converter having an inclined axis and an upwardly facing opening, and the charge thus formed in the converter is heated by the flame of a burner pointing towards the converter base, with complementary injection of industrially pure oxygen in the zone of the flame, the total quantity of oxygen injected being such that the ratio $$\frac{CO_2}{CO + CO_2}$$

in the fumes is at least equal to 0.8.

The invention also consists of an installation for carrying out this process, characterised in that it comprises a converter rotatable about its axis and carried by a tiltable cradle, a burner supplied with fuel pointing towards the converter base, and means for injecting industrially pure oxygen towards the flame, the burner and the oxygen injection means being mounted in the mobile stack of which the bottom opening can move opposite the converter opening.

BRIEF DESCRIPTION OF THE DRAWINGS

The invention will now be described in more detail, with reference to embodiments given by way of example and shown in the accompanying drawings.

DESCRIPTION OF THE PREFERRED EMBODIMENTS

Figure 1:
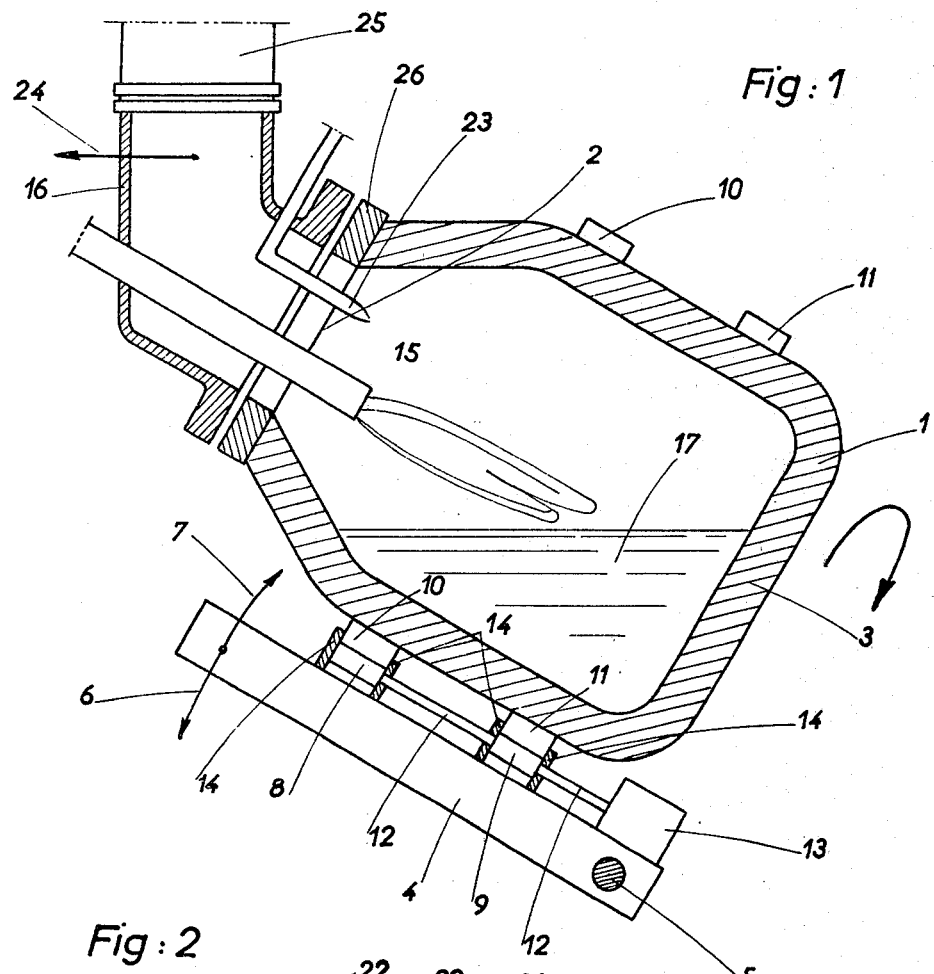
FIG. 1 is a section through an installation embodying the invention, along a vertical plane passing through the axis of the converter.

The installation shown in the drawings includes a furnace 1 in the form of a converter, i.e., in the form of a vessel whose opening 2 usually faces upwards and which has a bottom 3 closing its base.

The converter 1 is mounted on a cradle 4 pivotable about a horizontal pivot 5, in the direction of arrows, 6, 7.

The converter 1 itself can turn about its axis and rests on rollers 8, 9 by way of ring portions 10, 11. The rollers 8, 9 are rigidly connected to the shaft 12 of a motor 13, which rotates the rollers and therefore the converter 1. The converter is retained in its position on the cradle because its ring portions 10, 11 are supported by shoulders 14 on the shaft 12.

The mechanism 13 is a variable-speed mechanism. The average speed at which it rotates the converter 1 may for example be between 0 and 10 rev/min.

Figure 3:
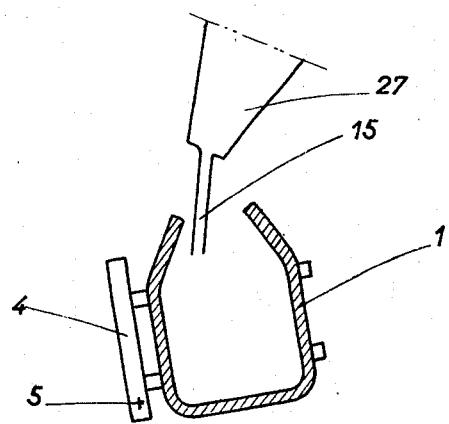
FIGS. 3, 4 and 5 are diagrammatic sections illustrating different positions of the converter during, respectively, charging of the converter, reductive melting, and discharging of the converter into a ladle.
Figure 4:
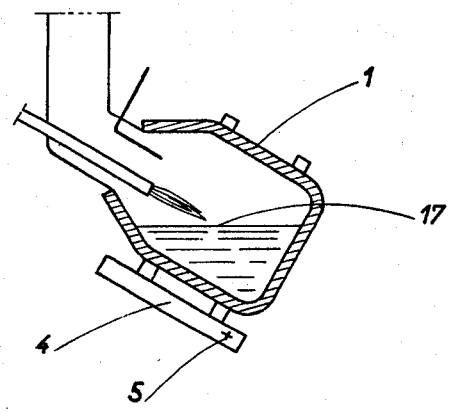

By means of the pivot 5, the unit comprising the converter 1 and cradle 4 can be tilted from a converter charging position (FIG. 3) to a metal pouring position (FIG. 5), by way of a position in which reductive melting takes place (FIG. 4).

The converter may for example have a basic internal lining.

The burner 15 is mounted in the bottom of a stack 16. Its axis is preferably set so that its flame points towards the charge 17 in the converter, and towards the converter base. The burner regulating system must be such that the rate of flow can vary from 1 to 15 times the minimum flow, with a constant stoichiometric-percentage ratio of fuel and oxygen.

The supporting agent for combustion in the burner is industrially pure oxygen.

Two embodiments are possible.

Figure 2:
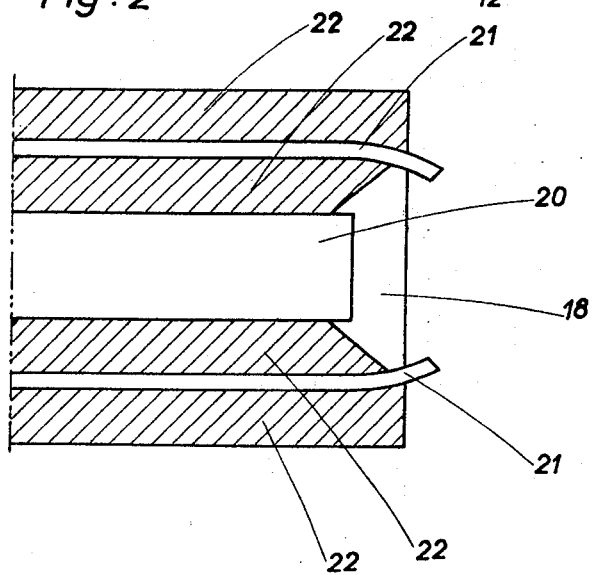
FIG. 2 is a section on a larger scale through one type of burner which may be used in an installation embodying the invention.

Firstly, a burner is used in which the range for regulation of the fuel/supporting-agent ratio is narrow. For example the percentage of oxygen in the stoichiometric ratio may be from 50 to 110%. In this case, the burner used is a burner unit of the type shown in FIG. 2, comprising a first combustion chamber 18 entered by a burner 20, supplied by a mixture of fuel and a rate of oxygen flow relative to the fuel below the stoichiometric ratio. In front of the base of the plane, there are the outlets from two or more additional lances 21, which inject industrially pure oxygen under high pressure. The burner and the portions enclosing the injection ducts 21 are cooled in a conventional manner by water circulating inside portions 22.

In these conditions, the burner 20 operates at a hypo-stoichiometric setting, ensuring cracking of the fuel by giving a flame having a high content of CO and $H_2$ and containing carbon in suspension. Its radiation is therefore high. This mixture is burned by additional oxygen jets from the ducts 21, and the total quantity of oxygen injected is such that the ratio $$\frac{CO_2}{CO + CO_2}$$

in the fumes is above 0.8.

To maintain the combustion rate of 0.8 in the fumes, a third injection lance 23 for industrial oxygen should preferably be used during melting. This lance is in the upper portion of the furnace, above the burner 15. It may be simply mounted on the stack, so that it can be withdrawn from the furnace as the mobile stack portion 16 moves.

Figure 5:
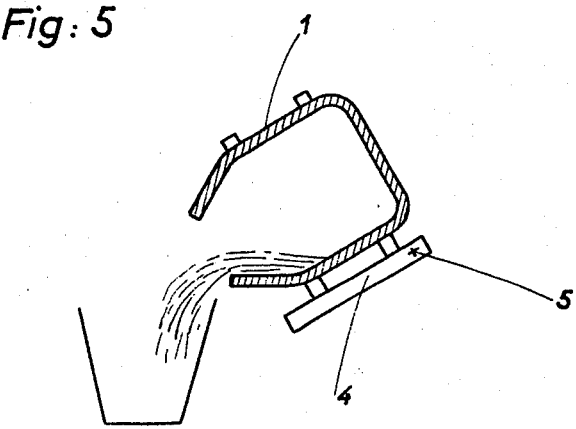

The burner 15 is also retractable, i.e., movable relative to the stack portion 16, and this portion 16 may be moved in the direction of an arrow 24 relative to the fixed stack portion 25, to uncover the opening of the converter 1 and allow it to pivot, either for charging (FIG. 3) or for pouring or any slag-off operations which may be required (FIG. 5).

The burner 15 and oxygen injector 23 are so regulated that the pressure in the furnace is always above atmospheric pressure. A diaphragm 26 at the opening of the furnace ensures that the diameter of the discharge opening is constant.

The oxygen jets of the burner are directed so that intimate mixing of the oxygen and the gases in the burner flame will occur at most halfway between the nozzle of the burner 15 and the converter base 3. Because of the high viscosity of the fumes, the oxygen jets protect the burner flame, preventing the smothering which caused some of the difficulties associated with processes previously tested.

If a burner is available which, besides having the wide range of flow rates indicated above, can operate at rates above 250 to 300% relative to the stoichiometric amount, the burner may be mounted directly on the furnace, without there being any supplementary oxygen injection through ducts 21. The cradle supporting the burner is inclined so that the flame is not smothered by the fumes, which are evacuated through the retractable stack 16.

Examples will be given of melting operations carried out in a converter having a solid bottom like that in FIG. 1, with an internal volume of 17m$^3$ and a design such that the length of the cylindrical portion of the converter is substantially equal to the diameter, viz, approximately 2.5m.

Any type of reducing agent may be used, for example graphite, fat or lean coal. The burner is fed with fuel and industrial oxygen. The converter is charged from three hoppers 27 like that shown diagrammatically in FIG. 3 (one each for the reducing agent, the ferrous charge proper, and a slag-forming substance such as lime).

In the converter position shown in FIG. 4, the angle of the converter axis to the horizontal is such that the surface of the refractory wet by the liquid bath is as large as possible. The converter is rotated throughout the melting operation.

The converter is heated by the burner 15, which operates with very fast flow rates during the first heating phase and then at progressively slower rates to provide enough heat to give the desired pouring temperature. The burner operates by burning the reduction carbon and more particularly by burning the carbon monoxide which is liberated from the charge and burns in the converter using the oxygen from the lance 23.

When the desired reduction rate is reached, the regulating additions, slagging off (if any) and pouring take place. For pouring, the retractable stack 16 is moved away and the converter is tilted as indicated in FIG. 5.

When used hereinafter the expression "normal M$^3$ per hour" or "Nm$^3$/h" corresponds to volumes measured under normal conditions at 0° C. and 760 mm of mercury pressure.

EXAMPLE 1: Melting body sheet scrap

The charge consisted of:
12.5 tons body sheet scrap;
carbon: 765 kg anthracite with 83% carbon;
120 kg lime.

After charging, the converter was rotated and the burner 15 was regulated at an industrial oxygen ratio of 70% of the stoichiometric amount and at a fuel flow rate of 510 kg/hr. The total rate of oxygen flow from the ducts 21 and lance 23 was 2,100 normal m$^3$ per hour not including 800 Nm$^3$/h of oxygen added with the fuel through burner 20 in stoichiometric amount.

Eight minutes from the beginning of the operation, the burner flow rate was reduced to 290 kg per hour for the fuel, and the oxygen flow rate was kept constant from jets 21 and 23 with reduction of the amount of oxygen introduced at 20 to 450 Nm$^3$/h.

In the 20th minute, the fuel flow rate was reduced to 35 kg/hr. and the total oxygen flow rate to 1,800 normal m$^3$ per hour from conduits 21 and 23 with 60Nm$^3$/h of oxygen being admitted at 20.

A sample of the charge was extracted in the 45th minute. This gave a carbon content of 1.7%.

In the 53rd minute, 11,950 tons of steel were poured, with the following composition by weight:

| | |
|---|---|
| C | 0.05 |
| Mn | 0.2 |
| Si | 0.2 |
| S | 0.01 |
| P | 0.01 |
| Fe | remainder. |

EXAMPLE 2: Reductive melting of iron powder

The charge consisted of 12.3 tons of iron powder and 1380 kg of carbon. The iron powder had a purity of 91% iron, i.e., it had 915 kg iron to 80 kg oxygen.

The converter 1 was rotated slowly and heated by the burner 15, which was regulated at an oxygen ratio of 70% of the stoichiometric amount and at a fuel flow rate of 740 kg/hr, the total oxygen flow rate being 2100 normal m$^3$ from jets 21 and 23 with 100 Nm$^3$/h introduced at burner 20.

Between the 16th and 22nd minutes of the operation, the fuel flow rate was reduced to 285 kg/hr with oxygen admitted at burner 20 amounting to 450 Nm$^3$/h, but the burner stoichiometric ratio and the total quantity of oxygen injected were maintained.

From the 22nd minute to the end of the operation, the burner operated with reduced fuel and oxygen flow rates of 30 kg/hr and 50 Nm$^3$/h at burner 20 and 1650 Nm$^3$/h for jets 21 and 23, respectively.

The metal was poured in the 59th minute. 11.3 tons of metal were recovered, with the following composition by weight:

| | |
|---|---|
| C. | 0.04 |
| Mn | 0.03 |
| Si | 0.15 |
| S | 0.005 |
| P | 0.004 |
| Fe | remainder. |

The following table provides additional data for Examples 1 and 2 above:

|  | Length of the Treatment in Minutes | Amount of Fuel per Hour in Kg. | Amount of $O_2$ per hour $Nm^3$ |
|---|---|---|---|
| Example No.1 | 8 | 510 | 2900 |
|  | 12 | 290 | 2550 |
|  | 33 | 35 | 1860 |
| Example No.2 | 16 | 740 | 3200 |
|  | 6 | 285 | 2550 |
|  | 30 | 30 | 1700 |

|  | Ratio $\dfrac{O_2}{fuel}$ |  | Coefficient of hyper-stoichiometry of oxygen (*) |  |
|---|---|---|---|---|
| Example No.1 | $\dfrac{2900}{510} =$ | 5.8 | 5.8/2.3 = | 2.50 |
|  | $\dfrac{2550}{290} =$ | 8.8 | 8.8/2.3 = | 3.80 |
|  | $\dfrac{1860}{35} =$ | 53. | 53/2.3 = | 23. |
| Example No.2 | $\dfrac{3200}{740} =$ | 4.30 | 4.30/2.3 = | 1.86 |
|  | $\dfrac{2550}{285} =$ | 8.90 | 8.9/2.3 = | 3.85 |
|  | $\dfrac{1700}{30} =$ | 56. | 56/2.3 = | 24 |

(*) The coefficient of hyperstoichiometry is established from the fact that the complete combustion of fuel oil requires 2.3 $Nm^3$ of oxygen per Kg of fuel.

Obviously, the invention is not restricted by the details of the embodiments just described, which may be modified without exceeding the scope of the invention.

I claim:

1. A reductive melting installation comprising a converter rotatable about its axis and carried by a tiltable cradle, an opening for said converter, a burner adjacent said opening supplied with fuel directed towards the interior base of said converter, an axial channel in said burner supplying a mixture of fuel and oxygen and at least two injectors adjacent the periphery of said burner for industrially pure oxygen discharging the industrially pure oxygen in front of the base of the burner flame.

2. Installation as described in claim 1 including means for supplying to said burner a mixture of fuel and oxygen in a hyper-stoichiometric oxygen-fuel ratio.

3. An installation as described in claim 1, said injectors for the industrially pure oxygen being so oriented that the mixture of injected oxygen with the flame of the burner occurs at approximately the mid-distance between the end of the burner and the bottom of the converter.

4. Installation as described in claim 1, the injection of the industrially pure oxygen in the flame providing a hyper-stoichiometric ratio of oxygen.

5. Installation as described in claim 1 including least one injector for industrially pure oxygen located at the upper part of the converter above the burner and directed toward the interior of the converter.

* * * * *